United States Patent
Filion et al.

[11] Patent Number: 5,413,376
[45] Date of Patent: May 9, 1995

[54] DRIVER'S SIDE AIR BAG COVER DOOR INCORPORATING A HORN ACTUATOR

[75] Inventors: Scott M. Filion, Newmarket, N.H.; Mary K. Marshall, York, Me.; Scott E. Rafferty, Rochester, N.H.

[73] Assignee: Davidson Textron Inc., Dover, N.H.

[21] Appl. No.: 151,115

[22] Filed: Nov. 12, 1993

[51] Int. Cl.$^6$ .............................................. B60R 21/16
[52] U.S. Cl. ................... 280/728.3; 280/731
[58] Field of Search ................ 280/728 A, 728 B, 731

[56] References Cited

U.S. PATENT DOCUMENTS

| | | | |
|---|---|---|---|
| 3,670,174 | 6/1972 | Sakakibara | 307/10 R |
| 3,819,205 | 6/1974 | Dunford et al. | 280/731 |
| 4,325,568 | 4/1982 | Clark et al. | 280/731 |
| 4,575,117 | 3/1986 | Uchida | 280/750 |
| 4,612,425 | 9/1986 | Kanai et al. | 200/61.55 |
| 4,638,131 | 1/1987 | Kidd et al. | 200/61.55 |
| 4,714,806 | 12/1987 | Inui et al. | 200/61.55 |
| 4,872,364 | 10/1989 | Kega et al. | 74/484 |
| 4,934,735 | 6/1990 | Embach | 280/731 |
| 5,002,306 | 3/1991 | Hiramitsu et al. | 280/731 |
| 5,062,661 | 11/1991 | Winget | 280/731 |
| 5,062,663 | 11/1991 | Satoh | 280/743 |
| 5,085,462 | 2/1992 | Gualtier | 280/731 |
| 5,178,409 | 1/1993 | Hiramitsu et al. | 280/731 |
| 5,186,490 | 2/1993 | Adams et al. | 280/731 |
| 5,265,905 | 11/1993 | Shelton | 280/731 |

FOREIGN PATENT DOCUMENTS 1301461 12/1989 Japan .............. B62D 1/04

*Primary Examiner*—Kenneth R. Rice
*Attorney, Agent, or Firm*—Reising, Ethington, Barnard, Perry & Milton

[57] ABSTRACT

An air bag cover door for a steering wheel mounted air bag module includes an inner cover, an outer cover, a horn actuator attached to the inside surface of the outer cover, and one or more protrusions extending between the inner and outer covers about the horn actuator. The protrusions prevent the inner cover from compressing the horn actuator under the pressure exerted by the stored material of the air bag. The outer cover, including its inside surface, is deformable upon hand pressure being exerted thereon and the horn actuator is responsive to such deformation to activate the vehicle horn. The horn actuator can be a transducer, such as a variable resistor, adhered to the inside surface. The inner cover is permanently secured to the base of the air bag module by, for example, rivets, while the outer cover section is removably secured to the base by, for example, screws. This construction permits removal of the outer cover section and access to the horn actuator without providing access to the contents of the air bag module.

19 Claims, 2 Drawing Sheets

DRIVER'S SIDE AIR BAG COVER DOOR INCORPORATING A HORN ACTUATOR

TECHNICAL FIELD

This invention relates generally to air bag cover doors for vehicles and, in particular, to a driver's side air bag cover door having a vehicle horn actuator incorporated therein.

BACKGROUND OF THE INVENTION

Steering wheels, because of their convenient location, typically include switches that actuate various motor vehicle accessories. Automobile horn switches are the most common of these. Traditionally, these horn switches have been relatively large buttons centrally located at the hub of the steering wheel. Their large size simplifies the operator's task of quickly locating and depressing the switch. See, for example, U.S. Pat. Nos.: 3,670,174, issued Jun. 13, 1972 to N. Sakakibara; 4,575,117, issued Mar. 11, 1986 to S. Uchida; 4,612,425, issued Sep. 16, 1986 to M. Kanai et al.; 4,638,131, issued Jan. 20, 1987 to R. L. Kidd et al.; 4,714,806, issued Dec. 22, 1987 to S. Inui et al.; and 4,872,364, issued Oct. 10, 1989 to K. Kaga et al.

Steering wheels are also the most convenient location for mounting a driver's side air bag. The air bag is often mounted at the hub of the steering wheel. However, the incorporation of an air bag unit within the steering wheel has made the inclusion of horn or other actuating switches within the steering wheel more complicated. Firstly, the air bag unit with its casing and cover door occupy a significant portion of the area within the steering wheel rim. Secondly, the cover door must be free to open upon expansion of the air bag.

Consequently, the horn switch has typically been relocated away from the hub and downsized to fit within the remaining space within the rim about the air bag cover door. See, for example, U.S. Pat. Nos.: 3,819,205, issued Jun. 25, 1974 to S. G. Dunford et al.; and 4,325,568, issued Apr. 20, 1982 to H. D. Clark et al. However, due to the historically conventional practice of locating a horn switch at the hub of a steering wheel, most drivers still feel more comfortable with a horn switch at the hub, particularly when faced with a panic situation. The conspicuous presence of a large pad at the hub further confuses drivers into mistakenly believing that the pad is the horn button.

Various arrangements have been disclosed for incorporating horn actuators, such as membrane switches, into air bag cover doors to thereby return the location of the horn switch to the hub. See, for example, Yoshio et al., Japanese Patent Application No. Hei 1[1989]-301461 and U.S. Pat. Nos.: 4,934,735, issued Jun. 19, 1990 to J. T. Embach; 5,002,306, issued Mar. 26, 1991 to T. Hiramitsu et al.; 5,062,661, issued Nov. 5, 1991 to L. J. Winget; 5,085,462, issued Feb. 4, 1992 to Q. E. Gualtier; 5,178,409, issued Jan. 12, 1993 to T. Hiramitsu et al.; and 5,186,490, issued Feb. 16, 1993 to G. V. Adams et al.

However, these arrangements are not entirely desirable from several standpoints. Firstly, many of these arrangements involve producing the horn actuator as an integral part of the air bag cover door. This requires constructing the horn actuator as a part of molding the cover door, resulting in an increase in the complexity and cost of manufacturing the cover door. Rather, it would be desirable to be able to mold the cover door as a separate component and thereafter to be able to quickly and easily attach or otherwise incorporate the horn actuator into the cover door.

Secondly, in some of these arrangements the presence of the horn actuator is visible on the exterior of the cover door which can be seen by the vehicle occupants. As a result, the horn actuator affects the aesthetic quality of the exterior surface of the cover door. Preferably, the horn actuator would not be perceptible on the exterior surface of the outer decorative cover so that the presence and/or location of the horn actuator can be indicated by an embossment or other marking on the exterior surface in accordance with the desired aesthetic look of the air bag cover door.

Thirdly, servicing (e.g., replacement) of the horn actuator and/or outer decorative cover in each of these arrangements requires disassembly of the air bag cover door that houses the air bag. Such disassembly of the cover door provides undesirable access to the air bag and other contents of the air bag module.

The prior art commonly meets certain of these three constraints, but not all. For example, the patent to Embach discloses a container for housing the air bag and a decorative outer cover disposed over the container. The container and outer cover both have tear seams that are aligned to permit deployment of the air bag. However, the container and outer cover are both secured by the same removable fastener such that, if the fastener is removed, both the outer cover and container can be removed thereby permitting undesirable access and potential unwanted tampering with the air bag.

Similarly, the patent to Gualtier discloses an air bag cover door that includes an inner cover and an outer cover fitted over the inner cover. The two covers have aligned tear seams formed therein, with the inner cover tear seam comprising perforations and the outer cover tear seam comprising a reduction in thickness of the outer cover. A horn switch is located between the inner and outer cover, either by securing it to the inner cover or by locating one contact on the inside surface of the outer cover and the other at a corresponding point on the outside surface of the inner cover. As with the patent to Embach, no arrangement is disclosed for providing removal of the outer cover and replacement of the horn switch while at the same time inhibiting access to the contents of the air bag module.

Another example is provided by the patent to Adams et al. Although the air bag cover disclosed therein includes a means for servicing and replacing the horn switch without permitting access to the air bag module, no provision is made for replacing the decorative air bag cover door without exposing the contents of the air bag module.

As a further example, the patents to Yoshio et al., Hiramitsu et al., and Winget each discloses a single cover for the air bag. Consequently, replacement of the cover requires that the contents of the air bag module be exposed, thereby permitting the unwanted access to the air bag.

As is made evident by Yoshio et al., it is known to use either screws or rivets to secure an air bag cover door to the base of the air bag module. Yoshio et al. shows various arrangements using either screws or rivets for this purpose. However, using screws allows undesirable access to air bag module contents. Using rivets, on the other hand, helps protect against tampering with the air bag, but makes replacement of the air bag cover door or horn actuator difficult because the rivets, which are intended as a permanent fastener, must be removed. In either event, the outer cover or horn actuator cannot be replaced without providing undesirable access to the interior of the air bag module.

Similarly, the construction shown in the Dunford et al. patent includes rivets used to secure the container to a metal bracket. The metal bracket, however, is secured along with the outer cover to the support plate via bolts threaded into nuts. Therefore, when the bolts are removed to permit replacement of the outer cover or access to the horn switch, the container can also be removed, thereby permitting access to the air bag.

U.S. Pat. No. 5,062,663, issued Nov. 5, 1991 to T. Satoh, also utilizes rivets. However, the air bag door cover comprises a pair of cut-in-half bodies forming the outer decorative cover and a thin resin film that holds the cut-in-half bodies together via protrusions in the cut-in-half bodies. Both the cut-in-half bodies and the resin film layer are secured to the case by a common set of rivets. Thus, in order to replace the outer cover (i.e., the cut-in-half bodies), the rivets must be removed, thereby providing access to the contents of the air bag module.

Thus, it would be advantageous to provide an air bag cover door that incorporates a horn actuator therein such that the outer cover and/or horn actuator can be serviced or replaced without providing access to the contents of the air bag module.

SUMMARY OF THE INVENTION

The above-noted shortcomings of prior art air bag cover doors are overcome by the present invention which in one aspect, comprises an inner cover section having a tear seam formed therein, an outer cover section having an inside surface and a tear seam formed therein, a horn actuator attached to the inside surface, and a protrusion adapted to extend between the inner and outer cover sections to space the inner cover section from the horn actuator when the inner and outer cover sections are attached to the steering wheel. The outer cover section is adapted to extend over the inner cover section. The inside surface of the outer cover section is deformable upon hand pressure being exerted thereon and the horn actuator is constructed to conform to any such deformation. The horn actuator exhibits a measurable change in characteristic upon deformation of the inside surface of the outer cover section due to pressure being exerted on the outer cover section.

This arrangement permits activation of the horn actuator by hand pressure being exerted on the outer cover section of the air bag cover door, while at the same time prevents outward pressure exerted by the stored material of the air bag from compressing and activating the horn actuator.

Preferably, the horn actuator is operable to exhibit the actuating characteristic without the horn actuator contacting the inner cover section. The horn actuator can be a variable resistor or membrane switch adhered to the inside surface of the outer cover section. A variable resistor is preferred, in which case the non-actuating characteristic is a first resistance and the actuating characteristic is a second resistance that is different than the first resistance. The height of the protrusion can be greater than the thickness of the variable resistor so that the variable resistor will not contact the inner cover section. Also, the variable resistor can be recessed into the outer cover section so that the height of the protrusion and the space between the inner and outer cover sections can be reduced.

The protrusion can be one of a plurality of protrusions unitary with the inner cover section and located on the inner cover section such that they are spaced about the variable resistor in contact with the inside surface when the inner and outer cover sections are attached to the steering wheel.

In accordance with another aspect of the present invention, the inner cover section is permanently secured to an air bag module base, and the outer cover section substantially covers the inner cover section and is removably coupled to the base. Since the outer cover section is removable and the inner cover section is not, the outer cover section can be removed and replaced, if necessary, without exposing the air bag and other contents of the air bag module. Additionally, this construction allows the horn actuator to be incorporated into the air bag cover door and permits servicing of the horn actuator without exposing the contents of the air bag module. Preferably, the horn actuator is attached to the outer cover, rather than the inner cover, so that it can be removed and replaced with the outer cover section without the necessity of performing any operation on the inner cover section that houses the air bag.

Preferably, the inner cover section includes a pair of opposed sidewalls that each have an upper and lower portion and the outer cover section includes a pair of opposed sidewalls that extend over the upper portion of the sidewalls of the inner cover section. The sidewalls of the inner and outer cover sections can then each have a set of clearance holes aligned with holes in the base so that the outer cover section can be removably secured to the base by screws. The lower portions of the inner cover section sidewalls that extend below the outer cover section sidewalls can each have a further set of clearance holes aligned with clearance holes in the base so that the inner cover section can be permanently secured to the base by rivets.

BRIEF DESCRIPTION OF THE DRAWINGS

A preferred exemplary embodiment of the present invention will hereinafter be described in conjunction with the appended drawings, wherein like designations denote like elements, and.

DETAILED DESCRIPTION OF THE PREFERRED EMBODIMENT

Figure 1:
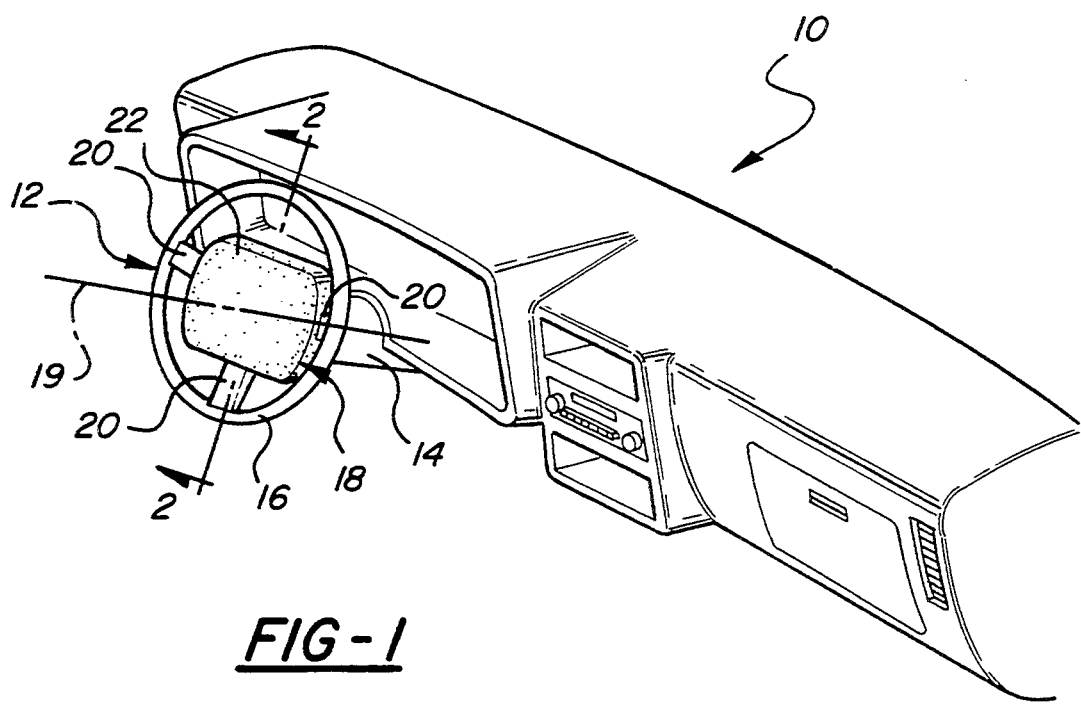
FIG. 1 is a perspective view of a motor vehicle dashboard and a steering wheel incorporating the present invention.
Figure 2:
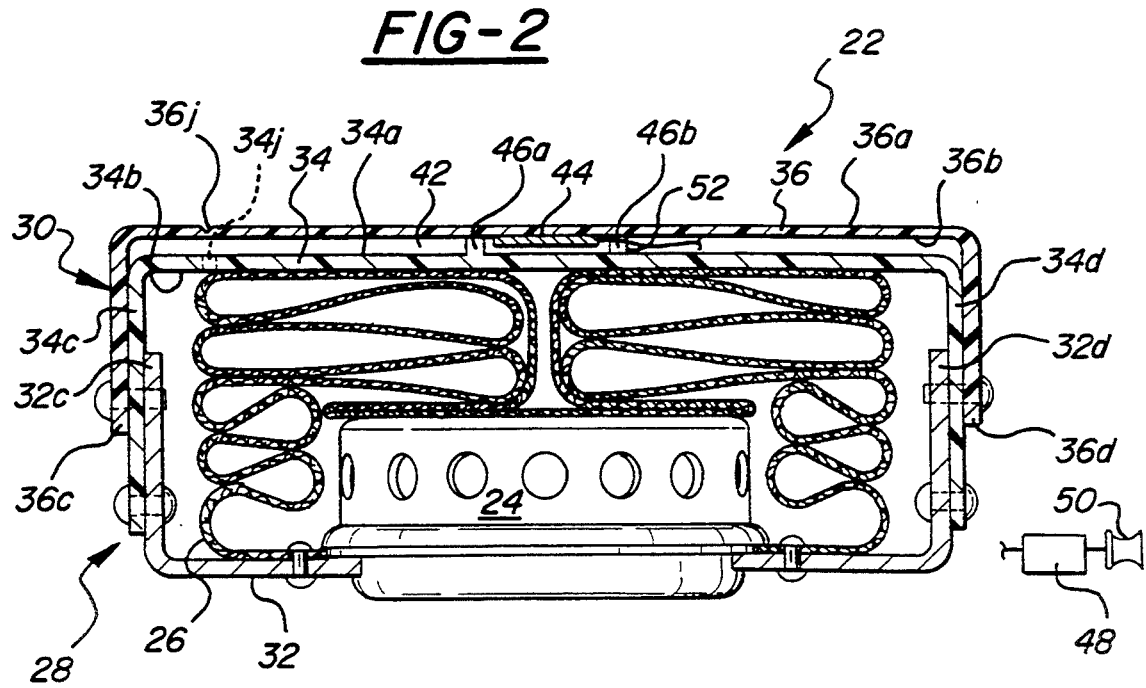
FIG. 2 is a partially schematic and cross-sectional view taken along the 2—2 line of FIG. 1.

As shown in FIG. 1, a motor vehicle dashboard has a steering wheel 12 mounted at the upper end of a steering column 14. Steering wheel 12 has a rim 16 attached to a hub section 18 via a plurality of spokes 20. Hub 18 is mounted at the central axis 19 of steering column 14. As shown in FIG. 2, hub section 18 incorporates an air bag module 22 with a gas generator 24 and an air bag 26 operably connected about gas generator 24 to receive any gas emanating therefrom. Gas generator 24 and air bag 26 are mounted inside a casing 28. Casing 28 includes a cover door 30 that is mounted to a base 32 and that is normally closed to conceal base 32, gas generator 24 and air bag 26.

Cover door 30 includes an inner cover section 34 and a decorative outer cover section 36. Inner cover 34 acts in conjunction with base 32 to contain air bag 26, while outer cover 36 provides an aesthetically pleasing decorative surface 36a that can include indicia and other detailing. Inner cover 34 includes an outer surface 34a that is located opposite an inside surface 36b of outer cover 36. An inside surface 34b of inner cover 34 is in contact with the stored material of air bag 26. As described in greater detail below, inner cover 34 and outer cover 36 are separately connected to base 32 such that outer cover 36 can be easily removed for servicing while inner cover 34 cannot. Also, as described below, outer cover 36, including inside surface 36b, is deformable under the force of hand pressure to allow activation of a horn actuator incorporated between inner cover 34 and outer cover 36. This arrangement allows removal of the decorative outer cover section 36 and servicing of the horn actuator without exposure of the contents of air bag module 22. Consequently, the opportunity for unwanted tampering with air bag 26 is reduced.

Inner cover 34 is permanently secured to base 32 at various points about its periphery by permanent fasteners such as rivets. Outer cover 36 is removably secured to base 32 at various points about its periphery by removable fasteners such as screws. As used herein and in the claims, "permanently secured" means secured by any of those means of connection that are not intended to be removable, such as rivets and certain types of adhesives. This can also include such things as one-way screws and other fasteners that, while removable, require special tools not widely available. Contrariwise, "removably secured" means secured by removable fasteners such as bolts, screws, clips, or "snap-in" mountings.

Figure 2A:
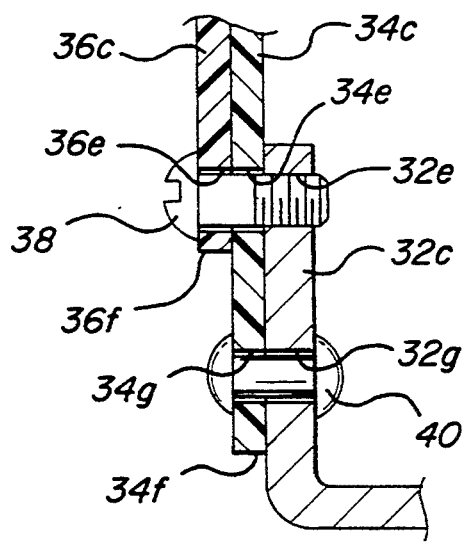
FIG. 2A is an enlarged, fractional view of the interconnection of the air bag module base and the inner and outer cover sections.

In particular, inner cover 34 includes a pair of opposed sidewalls 34c, 34d that abut against corresponding sidewalls 32c, 32d of base 32. Outer cover 36 similarly includes a pair of opposed sidewalls 36c, 36d, each of which overlies an upper portion of sidewalls 34c, 34d, respectively. Referring momentarily to the enlarged view shown in FIG. 2A, sidewall 36c includes a clearance hole 36e that is aligned with a corresponding clearance hole 34e in the upper portion of sidewall 34c. These holes are aligned with a threaded hole 32e in sidewall 32c. A screw 38 extends through clearance holes 36e and 34e and is threaded into hole 32e to removably secure outer cover 36 to base 32. As will be appreciated by those skilled in the art, means other than tapped hole 32e could be used to retain screw 38. For example, hole 32e could be formed as a clearance hole for screw 38 and a weld nut could be attached on the inside surface 32b of base 32 in alignment with hole 32e.

Figure 3:
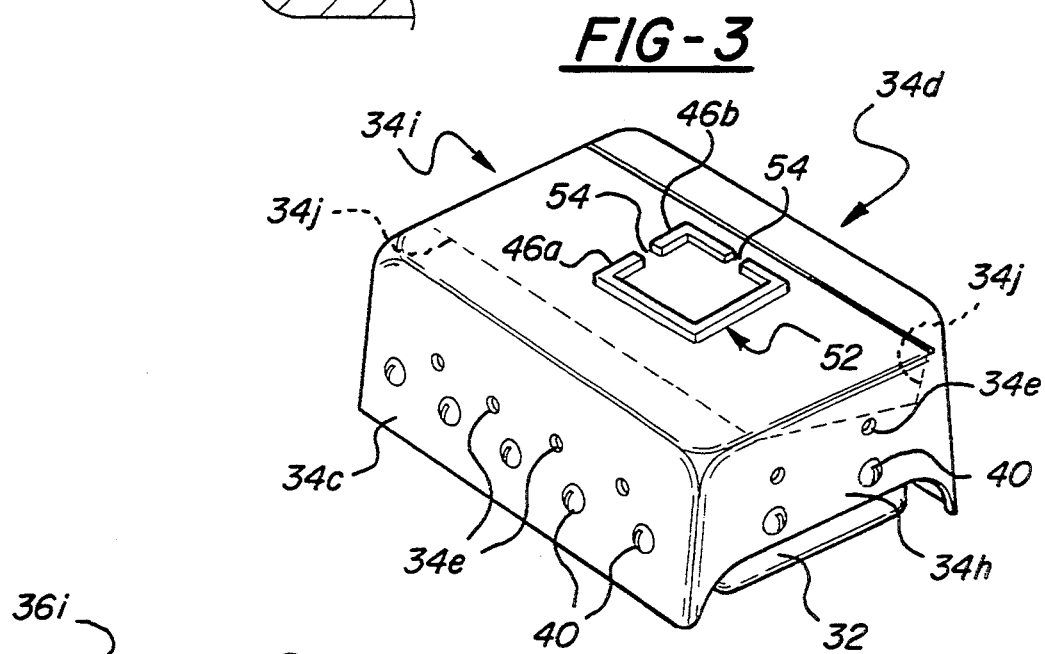
FIG. 3 is a perspective view of the inner cover section mounted to the air bag module base.
Figure 4:
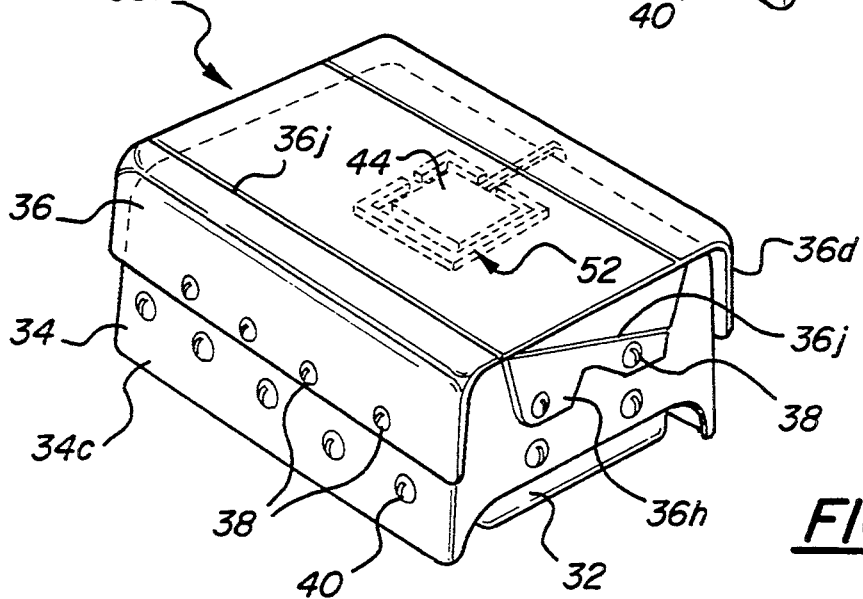
FIG. 4 is a perspective view of the outer cover section mounted over the inner cover section and secured to the air bag module base.

Sidewall 34c includes a lower portion that extends from the bottom edge 36f of sidewall 36c to the bottom edge 34f of sidewall 34c. This lower portion includes a clearance hole 34g that is aligned with a corresponding clearance hole 32g located in sidewall 32c of base 32. A rivet 40 extends through clearance holes 34g and 32g to permanently secure inner cover 34 to base 32. AS indicated in FIG. 3, inner cover 34 includes not only sidewalls 34c, 34d, but also a second pair of opposed sidewalls, 34h, 34i (only one shown). Spaced along each of the sidewalls of inner cover 34 are a set of clearance holes 34e and a set of clearance holes 34g, which in FIG. 3 are obscured by rivets 40. The number and spacing of these holes is chosen such that inner cover 34 is suitably secured to base 32. Similarly and as indicated in FIG. 4, outer cover 36 also has a second pair of opposed sidewalls 36h, 36i (only one shown). Each of the sidewalls of outer cover 36 has a set of clearance holes 36e spaced along its length and located such that they align with holes 34e when covers 34 and 36 are fitted over base 32. As shown, each of these pairs of aligned holes 34e and 36e receives one of the screws 38 that removably secure outer cover 36 to base 32. Of course, base 32 has corresponding sidewalls and a corresponding plurality of holes 32e and 32g.

Referring back to FIG. 2, outer cover 36 extends farther upward than inner cover 34 to define a space 42 between the inside surface 36b of outer cover 36 and the outer surface 34a of inner cover 34. Outer cover 36 is molded from semi-flexible TPE, TPO, or similar plastic material such that hand pressure exerted on outer cover 36 operates to deflect inside surface 36b toward inner cover 34. A horn actuator 44 is located within space 42 on inside surface 36b. Horn actuator 44 preferably comprises a transducer that conforms to inside surface 36b and that is responsive to the deformation of inside surface 36b to exhibit a measurable change in characteristic. This measurable change can then be detected and used to activate the vehicle horn.

Transducer 44 is secured to inside surface 36b by an adhesive layer (not shown) through which deformations of inside surface 36b are coupled to transducer 44. Any suitable adhesive can be used, such as a urethane moisture cured base or a pressure sensitive adhesive. Silicon transfer adhesives, such as AR7163 manufactured by Adhesive Research of Glen Rock, Pa., are preferable.

Since transducer 44 operates in a deflection mode (i.e., in response to deformation of the surface to which it is attached), it need not be compressed against outer surface 34a of inner cover 34 to operate. Moreover, it is desirable that transducer 44 be spaced from and not contact outer surface 34a because point loading by air bag 26 pressing on inner cover 34 could result in undesirable activation of the vehicle horn by causing inner cover 34 to compress transducer 44 against outer cover 36. Thus, as is discussed in greater detail below, inner cover 34 includes protrusions or standoffs 46a, 46b that extend upward from inner cover 34 and rest against inside surface 36b to prevent actuation of transducer 44 by inner surface 34 under the pressure exerted by air bag 26. Alternatively or additionally, transducer 44 could be located within a recess formed in inside surface 36b to prevent inadvertent actuation of transducer 44 by air bag 26.

Transducer 44 preferably comprises a variable resistor or piezoelectric element. Thus, for example, if a variable resistor is used, it would exhibit a particular resistance value (e.g., a very large resistance) as the non-actuating characteristic (i.e., in the absence of pressure being exerted on outer cover 36), and would exhibit a different resistance value (e.g., a measurably lower resistance) as the actuating characteristic (i.e., upon deformation of inside surface 36b due to pressure being exerted on outer cover 36). Suitable variable resistors are available from Interlink Electronics under the brand name FSR (force sensitive resistor) and from CSI Keyboards, where they are referred to as pressure point potentiometers. Preferably, when used as transducer 44, these variable resistors have a generally square shape with a size of one and three-quarters of an inch per side, which gives a horn actuation area of approximately nine square inches.

Alternatively, a membrane switch responsive to deflection of outer cover 36 could be used in place of transducer 44, in which case the non-actuating characteristic would be electrical isolation of the contacts of the membrane switch and the actuating characteristic would be closure of the contacts. A suitable membrane switch is available from Memtron Technologies Inc. of Frankenmuth, Mich. and is disclosed in application Ser. No. 08/010,142, filed Jan. 28, 1993 and assigned to the assignee of the present invention. The disclosure of Ser. No. 08/010,142 is hereby incorporated by reference. Regardless of the device used, horn actuator 44 is connected to an electrical circuit 48 that is responsive to the actuating characteristic to energize a vehicle horn 50.

As can be seen in FIGS. 2, 3, and 4, inner cover 34 includes a tear seam 34j and outer cover 36 includes a tear seam 36j that is aligned with tear seam 34j. Tear seam 34j is formed by perforations that are fifty thousandths of an inch thick and one-quarter to one-half of an inch long. Tear seam 36j comprises a suitable reduction in thickness of outer cover 36.

As shown in FIG. 3, standoffs 46a, 46b preferably comprise ridge-like protrusions that form a rectangular protrusion 52 sized to completely circumscribe transducer 44, except at a pair of openings 54 through which electrical leads are routed from circuit 48 to transducer 44. More specifically, rectangular protrusion 52 includes a first standoff 46a that forms two adjacent sides of protrusion 52 and a part of the third and fourth sides of protrusion 52. Protrusion 52 also includes a second standoff 46b that forms the remaining part of the third and fourth sides of protrusion 52 and that, along with standoff 46a, defines openings 54. This ridge-like construction of protrusion 52 is advantageous because it avoids point pressure loading on outer cover 36 that can result from the use of separate single point standoffs, such as those shown in the aforementioned application Ser. No. 08/010,142.

Referring again briefly to FIG. 2, protrusion 52 has a height that is greater than the thickness of transducer 44 so that outer surface 34a will be prevented from contacting and actuating transducer 44. Preferably, for a transducer or membrane switch having a thickness of twenty thousandths of an inch, protrusion 52 extends approximately one-tenth of an inch above outer surface 34a and has a width of about one-tenth of an inch. However, the constraint on the height of protrusion 52 is not needed if transducer 44 is recessed into outer cover 36 and, if recessed far enough, protrusion 52 would not be required at all. Preferably, protrusion 52 is formed as a unitary part of inner cover 34 although it will of course be appreciated that protrusion 52 could be located on and formed as a part of outer cover 36.

It will thus be apparent that there has been provided in accordance with the present invention an air bag cover door for use in a steering wheel mounted air bag module which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the spirit and scope of the appended claims.

We claim:

1. An air bag cover door for use in a steering wheel mounted air bag module, comprising:
    an inner cover section having a tear seam formed therein;
    an outer cover section adapted to extend over said inner cover, said outer cover section having an inside surface deformable upon hand pressure being exerted on said outer cover section, said outer cover section further including a tear seam formed therein;
    a horn actuator attached to said inside surface and being constructed to undergo deformation upon hand pressure being exerted on said outer cover section, said horn actuator exhibiting a non-actuating characteristic in the absence of pressure being exerted on said outer cover section and exhibiting an actuating characteristic upon undergoing the deformation; and
    a protrusion adapted to extend between said inner cover section and said inside surface to space said inner cover section from said horn actuator when said inner and outer cover sections are attached to the steering wheel.

2. An air bag cover door as defined in claim 1, wherein said horn actuator is operable to exhibit said actuating characteristic without said horn actuator contacting said inner cover section.

3. An air bag cover door as defined in claim 2 wherein said horn actuator comprises a variable resistor adhered to said inside surface, whereby said non-actuating characteristic is a first resistance and said actuating characteristic is a second resistance that is different than said first resistance.

4. An air bag cover door as defined in claim 3, wherein said protrusion is a unitary part of said inner cover section having a height that is greater than the thickness of said variable resistor, said protrusion being located on said inner cover section such that it contacts said outer cover section proximate said variable resistor when said inner and outer cover sections are attached to the steering wheel.

5. An air bag cover door as defined in claim 3, wherein said protrusion is one of a plurality of protrusions unitary with said inner cover section and located on said inner cover section such that they are spaced about said variable resistor in contact with said inside surface when said inner and outer cover sections are attached to the steering wheel.

6. An air bag cover door as defined in claim 2, wherein said horn actuator is located within a recess in said outer cover section.

7. An air bag cover door as defined in claim 2, wherein said horn actuator comprises a membrane switch having opposed contacts and being adhered to said inside surface, whereby said non-actuating characteristic is electrical isolation of said contacts and said actuating characteristic is closure of said contacts.

8. An air bag cover door as defined in claim 1, wherein said inner cover section includes a first pair of opposed sidewalls, each having a first set of holes therein for securing said inner cover section to the steering wheel; and wherein said outer cover section includes a second pair of opposed sidewalls, each having a second set of holes therein for securing said outer cover section to the steering wheel.

9. An air bag cover door as defined in claim 8, wherein said first pair of sidewalls each include an upper portion and a lower portion, wherein said upper portions include openings therein and said first set of holes are located on said lower portions, and wherein said openings and said upper and lower portions are arranged such that, when said inner and outer cover sections are attached to said steering wheel, said lower portions are located below said second pair of sidewalls and said openings are aligned with said second set of holes.

10. An air bag casing for a steering wheel mounted air bag module, comprising:
   a base adapted to be secured for rotation with the steering wheel;
   an inner cover section having a first tear seam therein and being permanently secured to said base to thereby define an air being storage compartment between said inner cover section and said base;
   an outer cover section substantially covering said inner cover section and being removably coupled to said base, said outer cover section having a second tear seam aligned with said first tear seam; and
   a horn actuator secured between said inner and outer cover sections;
   wherein said outer cover section includes an inside surface facing said inner cover section and wherein said horn actuator comprises a transducer attached to said inside surface.

11. An air bag casing as defined in claim 10, wherein said outer cover section includes a recess formed in said inside surface, wherein said transducer is secured within said recess.

12. An air bag casing as defined in claim 10, wherein said inner cover section includes at least one protrusion extending toward said outer cover section proximate said transducer, said protrusion having a height sufficient to prevent said inner cover section from contacting said transducer in the absence of hand pressure being exerted on said outer cover section.

13. An air bag casing as defined in claim 12, wherein said protrusion extends along said inner cover section proximate an edge of said transducer.

14. An air bag casing as defined in claim 10, wherein said inner cover section includes a plurality of protrusions spaced about the periphery of said transducer.

15. An air bag casing as defined in claim 10, wherein said inner cover section includes a first pair of opposed sidewalls extending towards said base, each of said first pair of opposed sidewalls having a first set of holes therein for securing said inner cover section to said base;
   wherein said outer cover section includes a second pair of opposed sidewalls extending towards said base, said second pair of sidewalls having a second set of holes therein for securing said outer cover section to said base.

16. An air bag casing as defined in claim 15, wherein said base includes a third set of holes aligned with said first set of holes and a fourth set of holes aligned with said second set of holes.

17. An air bag casing as defined in claim 15, wherein said second pair of sidewalls overlie said first pair of sidewalls and each of said second pair of sidewalls has a proximal edge and a distal edge located above said first set of holes; and
   wherein said first pair of sidewalls include openings aligned with said second set of holes to thereby provide clearance for a fastener used to secure said outer cover section to said base.

18. An air bag casing as defined in claim 15, wherein said inner cover section is secured to said base by rivets extending through said first set of holes and said outer cover section is secured to said base by threaded fasteners extending through said second set of holes.

19. An air bag casing as defined in claim 18, further comprising a horn actuator secured between said inner and outer cover sections.

* * * * *